Patented Oct. 14, 1952

2,614,062

UNITED STATES PATENT OFFICE 2,614,062

PREPARATION OF CATALASE

Havard L. Keil, Clarendon Hills, Ill., assignor to Armour and Company, Chicago, Ill., a corporation of Illinois No Drawing. Application December 14, 1948, Serial No. 65,296

17 Claims. (Cl. 195—62)

This invention relates to the preparation of catalase, and more particularly to the preparation of catalase from red blood cells or corpuscles. A commercial liquid consisting mainly of red blood cells or corpuscles is produced in packing plants and is loosely referred to as "hemoglobin" or "hemo." Such product, however, is more accurately defined as red blood cells or corpuscles.

The present application constitutes a substitute application for my co-pending application, Serial No. 597,368, filed June 2, 1945, now abandoned, for Preparation of Catalase.

Catalase has heretofore been prepared, but usually by laboratory methods which involve the use of solvents and are too complex and expensive for large scale production. Further, the yield is too small to justify plant operation.

An object of the present invention is to provide a simple process whereby red blood cells or corpuscles can be treated on a plant scale for the production of substantial yields of catalase. A further object is to provide a process whereby catalase can be prepared from red blood cells while extracting only a small proportion of the red blood cells solids and returning the remainder of the red blood cells solids as a by-product adapted for use as an adhesive and for the usual industrial uses. Other specific objects and advantages will appear as the specification proceeds.

The new process comprises broadly diluting plant run red blood cells with water and then bringing the pH through the use of an acid medium, including an alum solution, to about 5.5–4. A crude catalase product separates from the solution and is filtered off.

I prefer to purify the above precipitated product by dispersing it in water, and bringing the pH to 7–8, at which the catalase together with other insoluble proteins are dissolved. The pH is then brought to 5.5–4 and ethyl alcohol is slowly added; the catalase precipitate obtained is then filtered and dried. In all of the steps of the process up to that of drying, I prefer to keep the temperature not substantially above 40° F.

As a specific illustration of the process, the following is set out:

Plant run red blood cells are first diluted with 5 volumes of water and then dilute sulfuric acid is added until the pH reaches about 6. Sodium aluminum sulfate is then added to bring the solution to a pH of 4.8. A crude catalase separates from the solution and is filtered off. If the product is to be purified, the following steps are followed: The catalase thus obtained is next purified by dispersing the wet precipitate in a volume of water equal to the total original volume of the batch. Sodium citrate is then added to this dispersion until a pH of 7.2 is reached and at which the catalase, together with other insoluble proteins, is dissolved. I then add dilute sulfuric acid to bring the pH to 5.5–4 and then run in slowly cold ethyl alcohol equal to about one-half of the beginning volume. At this point, the catalase fraction precipitates and is filtered off in canvas bags. The precipitate is removed from the bags and spread on trays for vacuum drying. A low temperature, such as room temperature, is employed throughout the vacuum drying and usually requires about 8 hours. The material is then scraped from the pans, ground, and packaged.

It is important through all of the steps described, up to that of drying, a low chilling temperature be maintained, and I prefer to keep the temperatures in the neighborhood of 40° F. Any alum solution may be employed in the process for bringing the solution to a pH of about 5.5–4, and a solution or solutions of alum may be alone employed to bring the pH down to the desired range. I prefer to use sulfuric acid as above described because it is more economical to partially acidify with sulfuric acid and thus save the more expensive salts. Chrome and ferric alum, as well as sodium aluminum sulfate, have proved particularly useful in obtaining a substantial yield of crude catalase. While I can operate satisfactorily in a range of 5.5–4, I prefer a pH of 4.8 for best results in the first precipitation. In the second step, where the pH is raised to 7–8, I find that best results are obtained at about a pH of 7.2.

The product obtained in the first precipitation is an alum-catalase complex. It is necessary that this precipitation be carried out in the cold or the catalase loses its activity. The final product for purification contains about 1.25% of aluminum and has an ash content of 6.9. Both the crude catalase complex and the purified product are useful separately as products.

A further advantage in the process is that the red blood cells by-product remaining after the recovery of the catalase can be employed in the usual way for an adhesive. I remove about 7.5% of the red blood cells solids based on the dry weights and I return the remaining 92.5% back to industrial channels.

While in the foregoing specification, I have set forth, in an effort to illustrate one embodiment of the invention, specific treating materials, it will be understood that well-known equivalents of such materials may be employed and other variations in the process made without departing from the spirit of my invention.

I claim:

1. In a process for producing catalase from red blood cells, the steps of diluting chilled red blood cells with water and bringing the pH thereof to 5.5–4 in the presence of an alum solution to precipitate a catalase product while maintaining the temperature of the liquid body in the neighborhood of 40° F.

2. In a process for producing catalase from red blood cells, the steps of diluting chilled red blood cells with water and bringing the pH thereof to 4.8 in the precense of an alum solution to precipitate a catalase product while maintaining the temperature of the liquid body in the neighborhood of 40° F.

3. In a process for producing catalase from red blood cells, the steps of diluting red blood cells with water and bringing the pH to 5.5–4 by the use of an acid medium including an alum solution to precipitate the catalase product while maintaining the temperature of the liquid body below 40° F.

4. In a process for producing catalase from red blood cells, the steps of diluting red blood cells with water and adding an alum solution thereto to bring the pH to 5.5–4 to precipitate the catalase while maintaining the temperature of the liquid body in the neighborhood of 40° F.

5. In a process of producing catalase from red blood cells, the steps of diluting red blood cells with water, adding acid to bring the pH to around 6, and adding an alum solution to bring the pH to 5.5–4 while maintaining the temperature of the liquid body below 40° F.

6. In a process of producing catalase from red blood cells, the steps of diluting red blood cells with water, adding acid to bring the pH to around 6, and adding an alum solution to bring the pH to 4.8 while maintaining the temperature of the liquid body below 40° F.

7. In a process for producing catalase from red blood cells, the steps of diluting red blood cells with approximately 5 volumes of water, diluting with sulfuric acid until the pH reaches about 6, and adding an alum solution to bring the pH to 5.5–4 to precipitate catalase while maintaining the temperature of the liquid body in the neighborhood of 40° F.

8. In a process for producing catalase from red blood cells, the steps of diluting red blood cells with approximately 5 volumes of water, diluting with sulfuric acid until the pH reaches about 6, and adding sodium aluminum sulfate to bring the pH to 5.5–4 to precipitate catalase while maintaining the temperature of the liquid body in the neighborhood of 40° F.

9. In a process for producing catalase from red blood cells, the steps of diluting red blood cells with approximately 5 volumes of water, diluting with sulfuric acid until the pH reaches about 6, and adding chrome alum to bring the pH to 5.5–4 to precipitate catalase while maintaining the temperature of the liquid body in the neighborhood of 40° F.

10. In a process for producing catalase from red blood cells, the steps of diluting red blood cells with approximately 5 volumes of water, diluting with sulfuric acid until the pH reaches about 6, and adding ferric alum to bring the pH to 5.5–4 to precipitate catalase while maintaining the temperature of the liquid body in the neighborhood of 40° F.

11. In a process for producing catalase from red blood cells, the steps of diluting red blood cells with water, bringing the pH to 5.5–4 in the presence of an alum solution to precipitate a catalase-alum complex, separating the precipitate and diluting it with water, bringing the pH to 5.5–4, and adding an alcohol to precipitate the catalase product while maintaining the temperature of the liquid body in the neighborhood of 40° F.

12. In a process for producing catalase from red blood cells, the steps of diluting red blood cells with water, bringing the pH to 5.5–4 in the presence of an alum solution to precipitate a catalase-alum complex, separating the precipitate and diluting it with water, bringing the pH thereof to 7–8 to dissolve the catalase, bringing the pH to 5.5–4 by adding acid, and adding cold ethyl alcohol to precipitate the catalase product while maintaining the temperature of the liquid body in the neighborhood of 40° F.

13. In a process for producing catalase from red blood cells, the steps of diluting red blood cells with water, bringing the pH to 5.5–4 in the presence of an alum solution to precipitate a catalase-alum complex, separating the precipitate and diluting it with water, bringing the pH thereof to 7.2 to dissolve the catalase, bringing the pH to 5.5–4 by adding acid, and adding cold ethyl alcohol to precipitate the catalase product while maintaining the temperature of the liquid body in the neighborhood of 40° F.

14. In a process for producing catalase from red blood cells, the steps of diluting red blood cells with water, bringing the pH to 5.5–4 by adding an acid medium including an alum solution to precipitate a catalase-alum complex, separating the precipitate and diluting it with water, bringing the pH thereof to 7–8 to dissolve the catalase, bringing the pH to 5.5–4, adding ethyl alcohol to precipitate the catalase product, and drying the precipitate, all of said steps prior to the drying step being carried on at a temperature in the neighborhood of 40° F.

15. In a process for producing catalase from red blood cells, the steps of diluting red blood cells with water, bringing the pH to 5.5–4 by adding an acid medium including an alum solution to precipitate a catalase-alum complex, separating the precipitate and diluting it with water, bringing the pH thereof to 7–8 by adding sodium citrate solution to dissolve the catalase, bringing the pH to 5.5–4, adding ethyl alcohol to precipitate the catalase product, and drying the precipitate, all of said steps prior to the drying step being carried on at a temperature below 40° F.

16. In a process for producing catalase from red blood cells, the steps of diluting red blood cells with substantially 5 volumes of water, adding dilute sulfuric acid until the pH reaches about 6, adding an alum solution to bring the pH to about 5.5–4 to precipitate catalase, separating the catalase, dispersing it in a volume of water substantially equal to the original volume of the batch, adding sodium citrate solution until a pH of 7–8 is reached, adding dilute sulfuric acid to bring the pH to 5.5–4, adding slowly cold ethyl alcohol equal to about one-half of the beginning volume, and vacuum drying the precipitate, all of the steps prior to drying being carried on at a temperature around 40° F.

17. In a process for producing catalase from red blood cells, the steps of diluting red blood cells with substantially 5 volumes of water, adding dilute sulfuric acid until the pH reaches about 6, adding an alum solution to bring the pH to about 4.8 to precipitate catalase, separating the catalase, dispersing it in a volume of water substantially equal to the original volume of the batch, adding sodium citrate solution until a pH of 7.2 is reached, adding dilute sulfuric acid to bring the pH to 5.5-4, adding slowly cold ethyl alcohol equal to about one-half of the beginning volume, and vacuum drying the precipitate, all of the steps prior to drying being carried on at a temperature around 40° F.

HAVARD L. KEIL.

REFERENCES CITED

The following references are of record in the file of this patent:

UNITED STATES PATENTS

| Number | Name | Date |
| --- | --- | --- |
| 2,118,117 | Sevag | May 24, 1938 |

OTHER REFERENCES

Kiese, Chemical Abstracts, 1941, page 518.
Laskowski et al., Science 94, page 615 (1941).